(12) United States Patent
Kubota

(10) Patent No.: US 7,581,609 B2
(45) Date of Patent: Sep. 1, 2009

(54) FRONT SUSPENSION ARMS

(75) Inventor: Takahiko Kubota, Shizuoka-ken (JP)

(73) Assignee: Yamaha Hatsudoki Kabushiki Kaisha, Shizuoka-ken (JP)

(*) Notice: Subject to any disclaimer, the term of this patent is extended or adjusted under 35 U.S.C. 154(b) by 83 days.

(21) Appl. No.: 11/347,007

(22) Filed: Feb. 3, 2006

(65) Prior Publication Data
US 2006/0175105 A1 Aug. 10, 2006

(30) Foreign Application Priority Data
Feb. 3, 2005 (JP) ............... 2005-027464

(51) Int. Cl.
B62M 29/00 (2006.01)
(52) U.S. Cl. ............... 180/190; 180/182
(58) Field of Classification Search ......... 180/190, 180/182; 280/28, 93.512, 21.1, 16, 124.135, 280/124.136, 124.138
See application file for complete search history.

(56) References Cited

U.S. PATENT DOCUMENTS

| | | | | |
|---|---|---|---|---|
| 1,728,566 A * | 9/1929 | Johnson | ............... | 280/16 |
| 3,799,565 A * | 3/1974 | Burtis et al. | ............... | 280/16 |
| 3,861,492 A * | 1/1975 | Jensen, Sr. | ............... | 180/182 |
| 4,288,096 A * | 9/1981 | Enokimoto et al. | ... | 280/124.136 |
| 5,029,664 A * | 7/1991 | Zulawski | ............... | 180/190 |
| 5,257,801 A * | 11/1993 | Matsuzawa et al. | ... | 280/124.138 |
| 5,782,484 A * | 7/1998 | Kuhn, Jr. | ............... | 280/124.142 |
| 6,708,791 B2 * | 3/2004 | Alexander | ............... | 180/182 |
| 6,793,030 B2 * | 9/2004 | Pyykonen | ............... | 180/182 |
| 6,860,352 B2 * | 3/2005 | Mallette et al. | ............... | 180/182 |
| 2003/0159868 A1 * | 8/2003 | Alexander | ............... | 180/190 |
| 2004/0108674 A1 * | 6/2004 | McGaughy | ............... | 280/93.512 |
| 2004/0134702 A1 * | 7/2004 | Karpik | ............... | 180/190 |
| 2005/0110235 A1 * | 5/2005 | LeBlanc et al. | ............... | 280/124.135 |

* cited by examiner

Primary Examiner—Lesley D Morris
Assistant Examiner—Maurice Williams
(74) Attorney, Agent, or Firm—Knobbe, Martens, Olson & Bear, LLP

(57) ABSTRACT

A front suspension arm is formed such that it is less likely to collide with obstacles exposed above the surface over which the associated vehicle is operated. The arm also has a greater strength against impact forces from the front. In one configuration, the front suspension arm has a relatively straight portion that is positioned on a body side and the front suspension arm has a bent portion that is formed on the ground contacting element side. The front suspension arm can have two arms having an oblong or oval shape in cross section.

17 Claims, 9 Drawing Sheets (a)

(b)

(a)

(b)

US 7,581,609 B2

FRONT SUSPENSION ARMS

CROSS-REFERENCE TO RELATED APPLICATIONS

The present application claims the priority benefit of Japanese Patent Application No. 2005-027464, filed on Feb. 3, 2005, which is incorporated by reference in its entirety.

BACKGROUND OF THE INVENTION

1. Field of the Invention

The present invention generally relates to a vehicle suspension component. More particularly, the present invention relates to a front suspension arm that is provided between a forward portion of a vehicle body and a steering member that is positioned lower than, and to one side of, the forward portion of the vehicle body.

2. Description of the Related Art

Snowmobiles are used to travel over snow-covered terrain. To provide forward drive, a track belt extends over the drive wheels and the rear wheels that are positioned below the vehicle body. An engine drives the track belt to drive the snowmobile.

The snowmobile also comprises steering handle bars that can be positioned in a central transverse location. The handle bars are connected to a pair of steering skis through a suitable linkage. The steering skis support a forward portion of the snowmobile. By turning the handle bars, the steering skis can be rotated to the left and right such that the snowmobile can be steered.

Each of the steering skis is connected to the vehicle body by a suspension device that includes a front suspension arm. In such snowmobiles, the front suspension arm can be bent upward to reduce the likelihood of the front suspension arm contacting the snow surface. U.S. Pat. No. 6,793,030 discloses such a configuration. The front suspension arm in this type of snowmobile extends forward from under the vehicle body and the steering skis are attached to the ends of the suspension arm.

Because some snowmobiles have a front suspension arm that extends laterally of the vehicle body, the front suspension arm has a propensity to make contact with rocks, branches, stumps, and other debris. When the front suspension arm collides with such obstacles, the vehicle may experience shocks or the vehicle may incur damage to the front suspension arm.

SUMMARY OF THE INVENTION

In view of the foregoing, one object of the present suspension system is to provide a front suspension arm that is less likely to collide with obstacles exposed on the running path and that has a greater strength against impact forces from the front.

Accordingly, one aspect of the present invention involves a vehicle comprising a body. A first suspension arm extends laterally outward from the body. The first suspension arm has a first end and a second end with the first end being connected to the body. A steering member is attached to the second end of the first suspension arm. The steering member is positioned lower than the body. The first suspension arm comprises a bent shape such that the first end is located vertically higher than the second end.

Another aspect of the present invention involves a front suspension arm for a motor vehicle. The front suspension arm comprises a support member. An aperture extends at least part way through the support member. A first arm has a first end and a second end. The first end of the first arm is secured to the support member. A second arm has a first end and a second arm. The first end of the second arm is secured to the support member at a location spaced from the first end of the first arm by a first distance. A first connecting member is secured to the second end of the first arm. A second connecting member is secured to the second end of the second arm. The first arm has a generally linear portion proximate the first end of the first arm. The first arm has a bent portion proximate the second end of the first arm. The second arm has a generally linear portion proximate the first end of the second arm. The second arm has a bent portion proximate the second end of the second arm. At least a portion of at least one of the first and second arm comprises a cross-section in which a vertical dimension is smaller than a dimension generally perpendicular to the vertical dimension.

BRIEF DESCRIPTION OF THE DRAWINGS

These and other features, aspects and advantages of the present invention will now be described with reference to the drawings of a preferred embodiment, which embodiment is intended to illustrate and not to limit the invention. The drawings comprise 15 figures.

DETAILED DESCRIPTION OF THE PREFERRED EMBODIMENT

Figure 1:
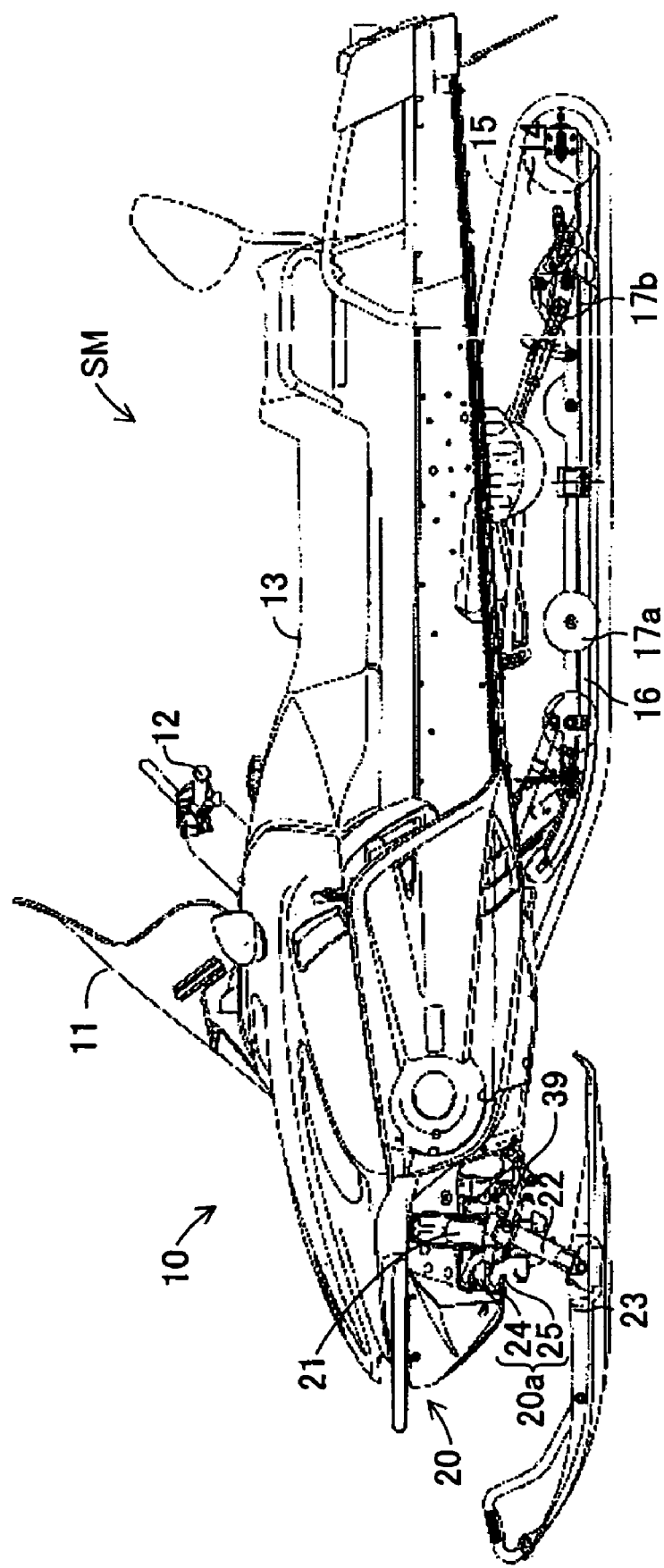
FIG. 1 is a side view of a snowmobile having a front suspension arm that is arranged and configured in accordance with certain features, aspects and advantages of the present invention.
Figure 2:
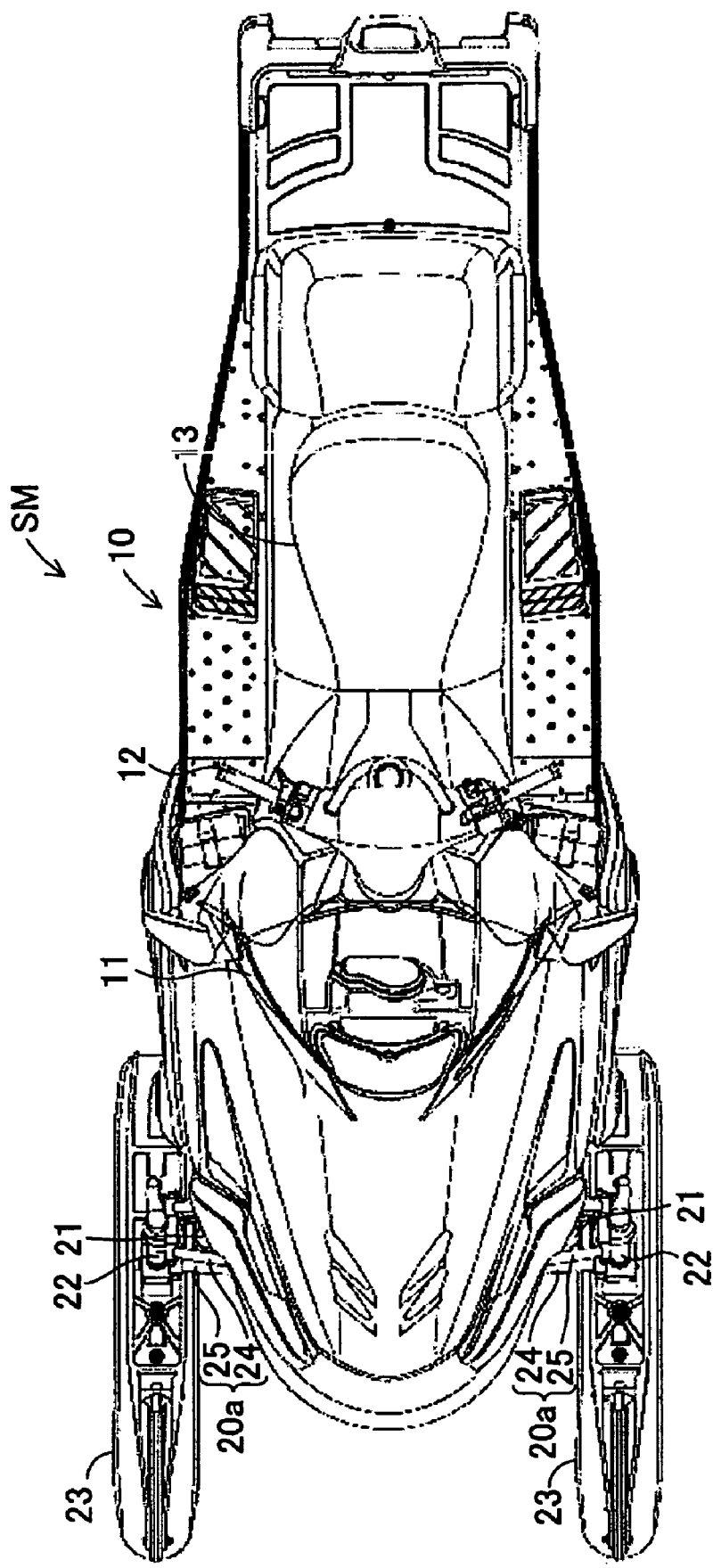
FIG. 2 is a plan view of the snowmobile of FIG. 1.

With reference initially to FIGS. 1 and 2, a snowmobile SM comprises front suspension arms 20*a* that are arranged and configured in accordance with certain features, aspects and advantages of the present invention. While the front suspension arms 20a will be described with reference to the snowmobile SM, certain features, aspects and advantages of the present invention also can be used with other types of vehicles. For instance, certain features, aspects and advantages of the present invention can be used with all terrain vehicles, dune buggies, small utility vehicles and the like.

With continued reference to FIGS. 1 and 2, a wind shield 11 can be mounted on a forward portion of the snowmobile SM. Preferably, the wind shield 11 can be positioned along an upper portion of a body 10 of the snowmobile SM. The body 10 comprises a main portion of the snowmobile SM.

A handle bar 12 or other directional control component can be positioned rearward of the wind shield 11. The handle bar 12 can be used to change the direction of the snowmobile SM through steering. A seat 13 can be positioned rearward of the wind shield 11. The seat 13 preferably is positioned along an upper portion of the body 10. The seat 13 can accommodate an operator, or driver. In one configuration, the seat 13 can accommodate a passenger as well.

Drive wheels (not shown) preferably are positioned along an underside of the snowmobile SM. The drive wheels (not shown) commonly are positioned generally centrally along the length of the body 10. As is known, the drive wheels (not shown) can be configured from sprockets. Rear wheels 14 can be positioned in a rearward direction relative to the snowmobile SM.

A track belt 15 extends over the drive wheels and the rear wheels 14. The track belt 15 can be formed with projections on the outside surface. The projections can be used to grip the terrain, or the snow that covers the terrain, to propel the snowmobile forward.

Slide rails 16 and idler wheels 17a, 17b can be used to help support the body 10 relative to the track belt 14. In one configuration, the slide rails 16 and the idler wheels 17a, 17b are along a lower portion of the track belt to increase the contact surface area between the track belt 15 and the terrain.

Two front suspension assemblies 20 are positioned inboard of the body and at the forward portion of the body 10. The front suspension assemblies 20 are mounted to each lateral side of the body 10. In some configurations, at least a portion of the front suspension assemblies 20 is connected to the handle bar 12.

Figure 3:
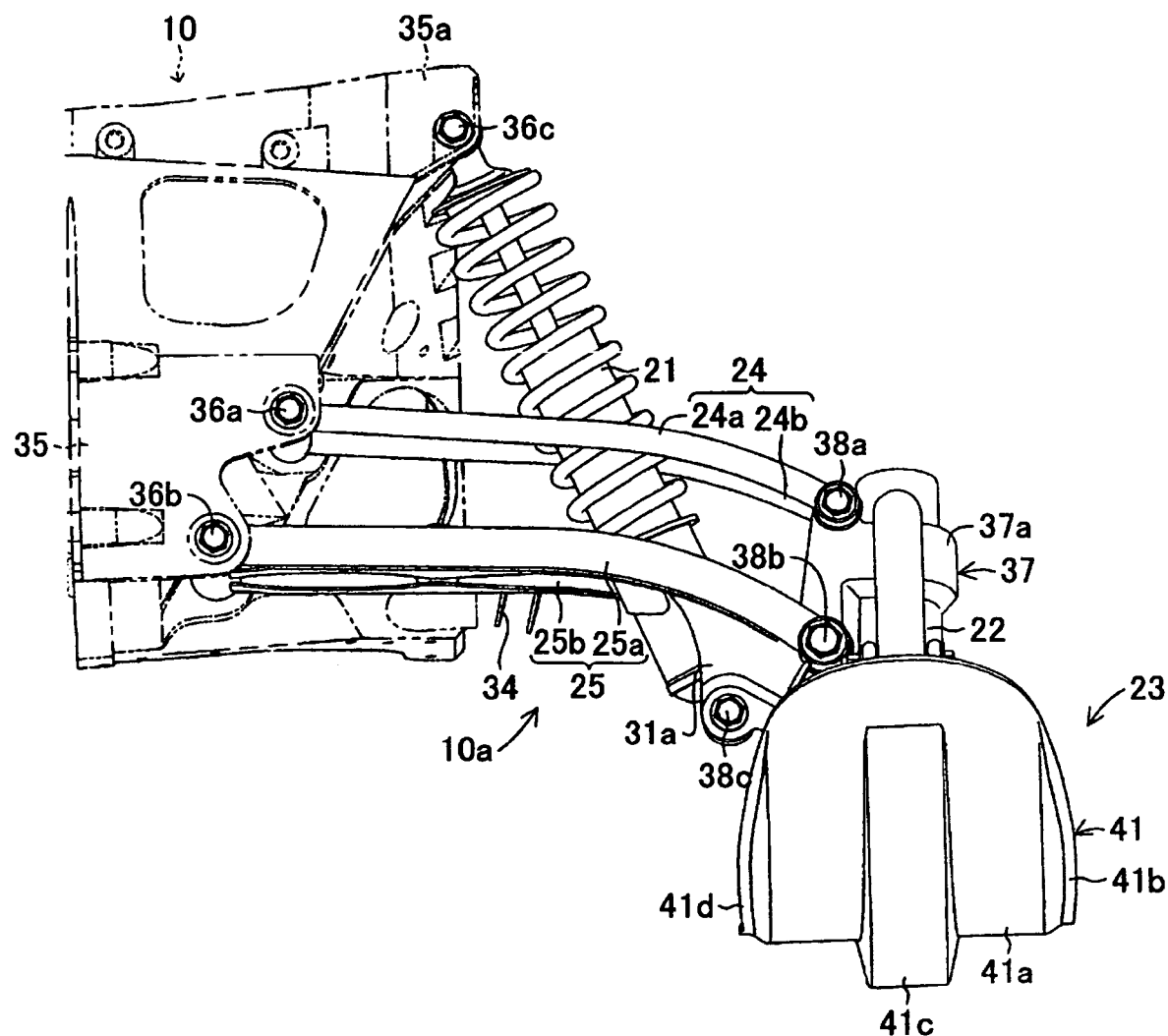
FIG. 3 is an enlarged front view of a portion of the snowmobile of FIG. 1 showing a mounting structure of the front suspension arm.
Figure 4:
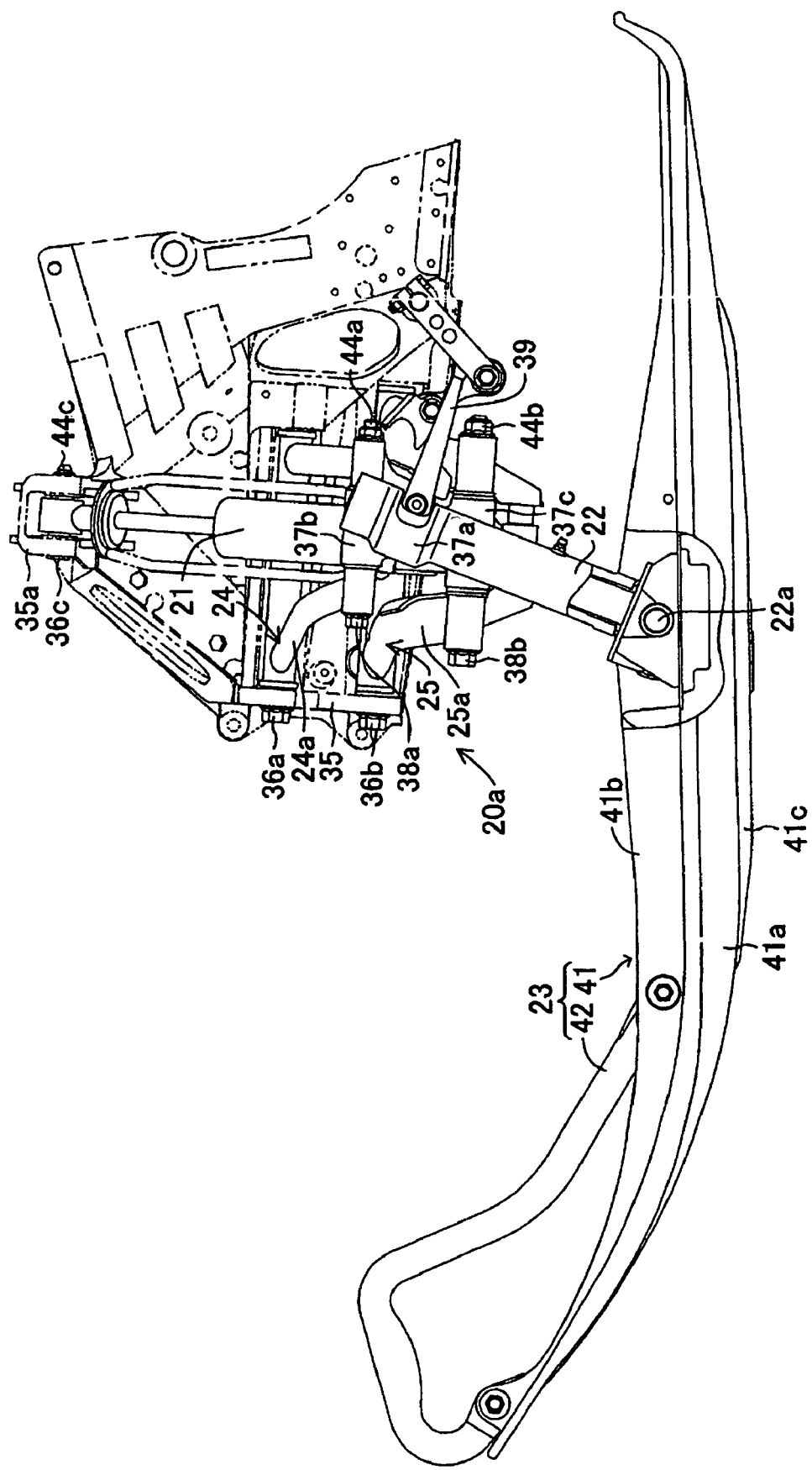
FIG. 4 is an enlarged side view of a portion of the snowmobile of FIG. 1 showing the mounting structure of the front suspension arm.

With reference to FIGS. 3 and 4, each of the front suspension assemblies 20 preferably comprises a shock absorber 21. Thus, a shock absorber 21 is provided on the left side and the right side of the body 10. The front suspension assemblies 20 also comprise connecting rods or struts 22 that are connected to respective shock absorbers 21 through lower arms 25, which will be described later. The connecting rods 22 preferably extend generally downward. More preferably, the connecting rods 22 extend forward and downward.

Steering skis 23 preferably are connected to the lower ends of the connecting rods 22. The steering skis 23 comprise steering members in the illustrated configuration. Other types of steering members (e.g., wheels) also can be used with certain features, aspects and advantages of the present invention.

Figure 5:
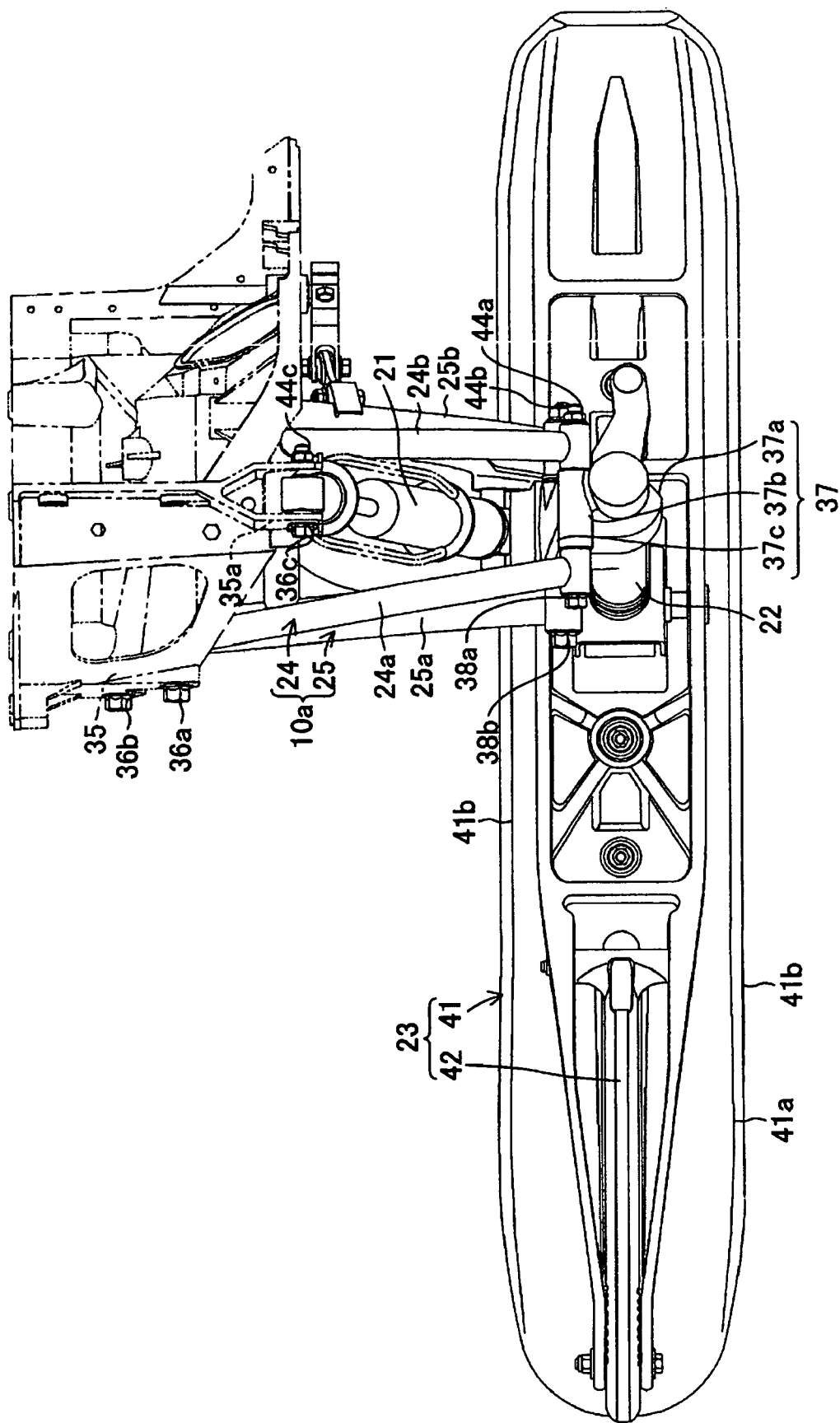
FIG. 5 is an enlarged plan view of a portion of the snowmobile of FIG. 1 showing the mounting structure of the front suspension arm.

Each of the front suspension assemblies 20 comprises an upper arm 24. In the illustrated configuration, the upper arm 24 comprises two arms 24a, 24b. Each of the front suspension assemblies 20 also comprises a lower arm 25. In the illustrated configuration, the lower arm 25 comprises two arms 25a, 25b. The upper and lower arms 24, 25 are illustrated in FIGS. 3 and 5. The front suspension arm 20a comprises the upper arm 24 and the lower arm 25.

Figure 6:
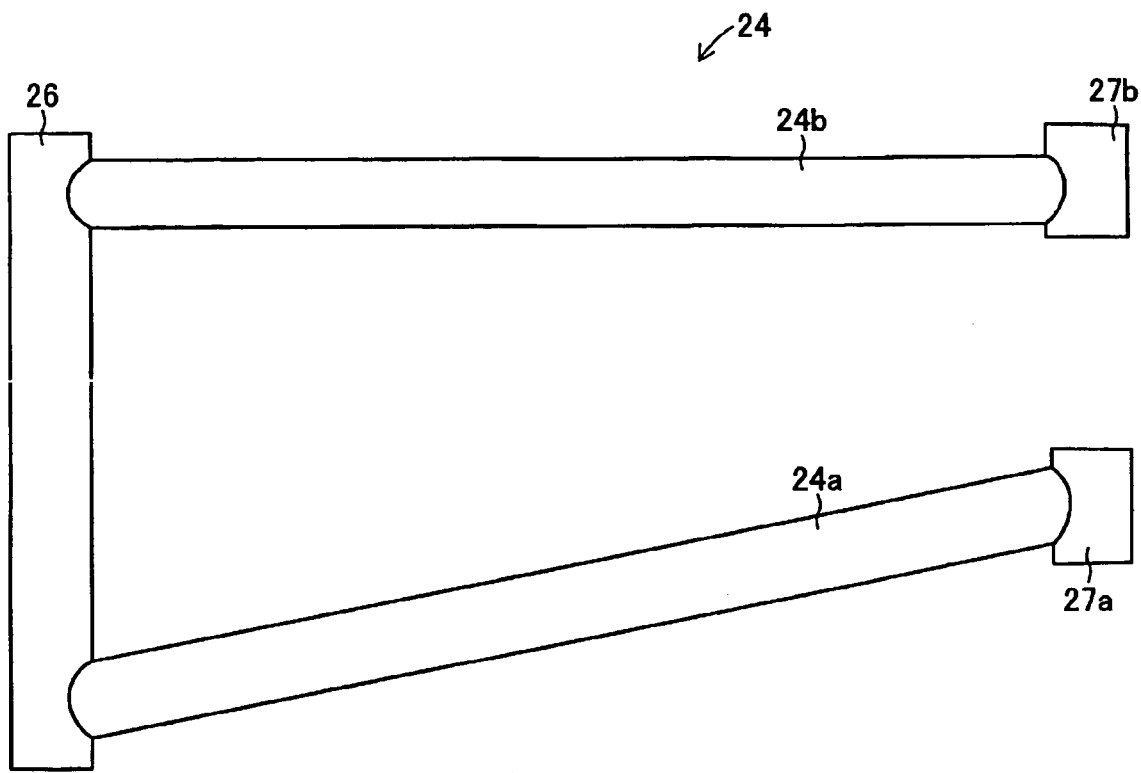
FIG. 6 is a plan view of an upper arm used in the snowmobile of FIG. 1.
Figure 7:
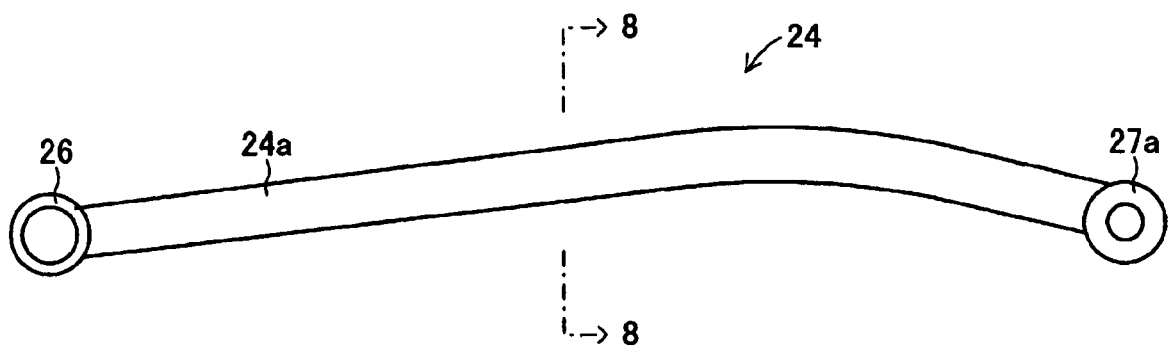
FIG. 7 is a side view of the upper arm of FIG. 6.

With reference to FIGS. 6 and 7, the upper arm 24 preferably is integrally formed such that the base ends (i.e., the left ends in the embodiment illustrated in FIGS. 6 and 7) of the arms 24a, 24b are fixed to the outside circumferential surface of a support member 26 and the opposite ends are fixed to the outside circumferential surface of respective connecting members 27a, 27b. The length of the support member 26 can be as long as approximately 20 cm and the lengths of the connecting members 27a, 27b can be as long as 3.5 cm. Other dimensions also can be used. Preferably, the arm 24b is fixed to the support member 26 at substantially a right angle relative to the support member 26 while the other arm 24a is fixed to the support member 26 with the end portion of the arm 24a being inclined toward the end portion of the arm 24b. In other words, the two arms 24a, 24b preferably converge toward each other in the direction away from the support member 26. In one configuration, the length of the arm 24b is approximately 30 cm while the arm 24a is slightly longer than the arm 24b such that the support member 26 can be arranged substantially parallel to the connecting members 27a, 27b.

In the illustrated configuration, the arms 24a, 24b each extends in an approximately straight line proximate the support member 26. Preferably, each of the arms 24a, 24b comprises a bend such that extend generally downward in the middle region. More preferably, the bent portions extend from the middle region to the connecting members 27a, 27b.

Figure 8:
FIG. 8 is a sectioned view of the upper arm taken along the line 8-8 of FIG. 7.

In one preferred configuration, the cross-sections of the arms 24a, 24b are generally oval, elliptical or oblong in shape with the dimension of the arms 24a, 24b in the vertical direction being shorter than the dimension in the direction perpendicular to the vertical direction. Such a configuration is shown in FIG. 8, for example.

Figure 9:
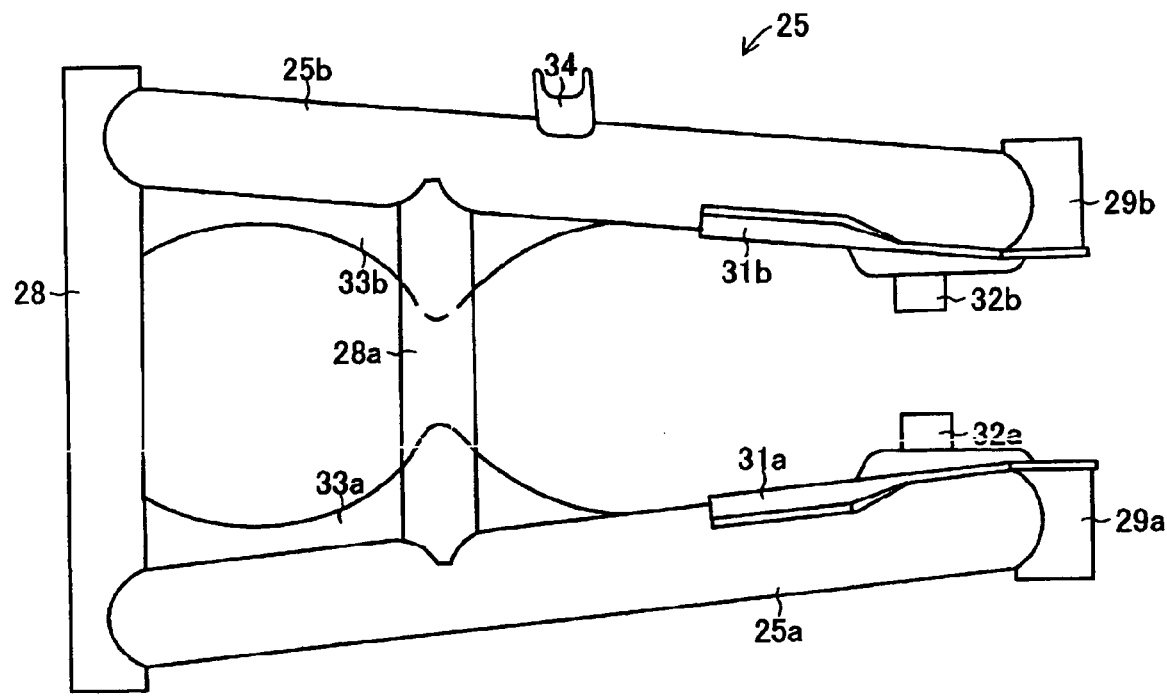
FIG. 9 is a plan view of a lower arm used in the snowmobile of FIG. 1.
Figure 10:
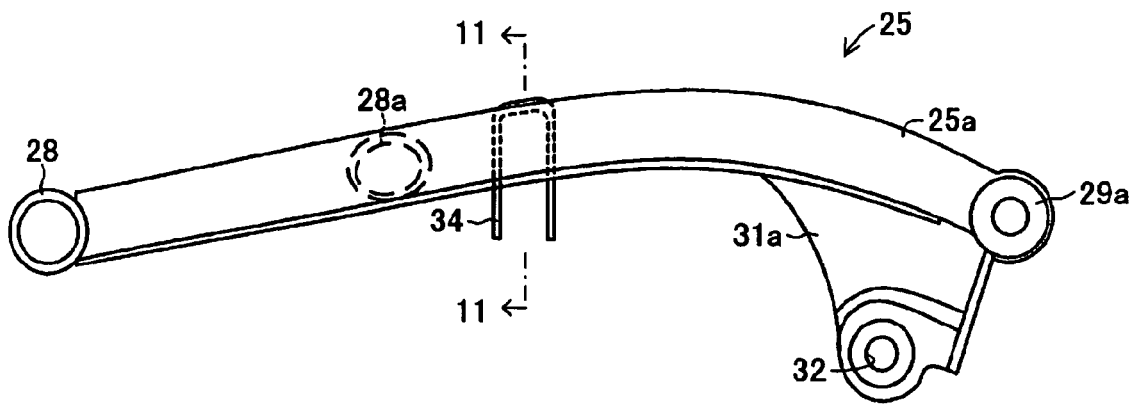
FIG. 10 is a side view of the lower arm of FIG. 9.

The lower arm 25 preferably is constructed as shown in FIGS. 9 and 10. As illustrated, the base ends (i.e., the left ends on FIGS. 9 and 10) of the arms 25a, 25b preferably are fixed to the outside surface of the support member 28. The illustrated arms 25a, 25b also are connected together by a joint member 28a. The joint member 28a preferably is positioned slightly closer to the support member 28 that to the other end of the arms 25a, 25b. Preferably, the other end portion of each arm 25a is fixed to the outside surface of a connecting member 29a, 29b.

The support member 28 preferably is slightly longer than the support member 26. In the illustrated configuration, the connecting members 29a, 29b are approximately as long as the connecting members 27a, 27b. The arms 25a, 25b can be suitably fixed to the support member 28. In the preferred configuration, the end portions of the arms 25a, 25b converge in a direction away from the support member 28. In one configuration, the arms 25a, 25b have lengths as long as about 34 cm. In such a configuration, the support member 28 is generally parallel to the connecting members 27a, 27b. The arms 25a, 25b preferably comprise a substantially straight portion and a bent portion. The bent portion preferably extends along less than about half of the length of the arms 25a, 25b. The bent portion is preferably formed such that the arm extends downward from the generally straight portion toward the connecting portions with the connecting members 29a, 29b. Thus, an upper surface of the front suspension is generally convex and a lower surface of the front suspension is generally concave when viewed along a longitudinal direction of the vehicle.

Upper portions of two reinforcement plates 31a, 31b are fixed to the opposing, inner surfaces of the arms 25a, 25b in the region of the connecting members 29a, 29b. The reinforcement plates 31a, 31b preferably extend downward from the arms 25a, 25b. These downwardly extending reinforcement plates can comprise projections 32a, 32b that are formed in the lower portion. In one embodiment, the projections 32a, 32b are cylindrical. The projections 32a, 32b preferably comprise insert holes 32 formed therein.

Figure 11:
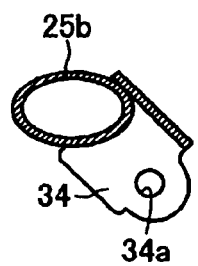
FIG. 11 is a sectioned view of the lower arm taken along the line 11-11 of FIG. 10.

With reference to FIG. 9, reinforcement plates 33a, 33b are provided on the opposing surfaces from the base ends (i.e., from the ends adjacent to the support member 28 to the middle portions of the arms 25a, 25b. The reinforcement plates 33a, 33b can have any suitable shape or construction. A mounting section 34 preferably is fixed to the arm 25b. In one configuration, the mounting section 34 can be formed of a pair of projections, each having a hole 34a, as shown in FIG. 11. Preferably, the mounting section 34 is secured to a middle region of the illustrated arm 25b. More preferably, the mounting section 34 is secured to an outer surface of the arm 25b. In some configurations, the mounting section 34 can be secured to the other arm 25a and, in other configurations, the mounting section 34 can be secured to another surface (e.g., inner, top or bottom or a combination of surfaces) of either or both arms 25a, 25b.

In one configuration, the arms 25a, 25b comprise a generally oval, elliptical or oblong configuration. In the illustrated configuration, the arms 25a, 25b are generally oval in shape with the oval having a shorter dimension in the vertical direction than the dimension that is perpendicular to the vertical direction. Similarly, the joint member 28a also preferably comprises a cross-section that is complementary to that of the arms 25a, 25b. In the illustrated configuration, the joint member 28a comprises a generally oval shape that is longer in the lateral direction and shorter in the vertical direction.

In some configurations, one or both of the arms 24, 25 are formed by welding together multiple components. In other configurations, the number of components can be reduced by integrally forming one or more of the components through suitable manufacturing processes.

With reference again to FIG. 3, the body 10 is provided with a bracket 35 that supports the front suspension arm 20a. Support holes, to which the upper arm 24 and the lower arm 25 can be mounted, preferably are provided in the bracket 35. The holes can be vertically spaced in some configurations. The holes preferably are formed through each of a pair of ears defined by the bracket 35.

The support member 26 can be formed as a hollow member or can have holes or apertures that extend only partially through the length of the support member. For instance, in some embodiments, the support member 26 can be generally solid with an aperture formed at each end. In another embodiment, the support member 26 is generally hollow such that the inner lumen of the support member 26 defines mounting holes. With the holes of the support member 26 aligned with the support holes of the bracket 35, a bolt 36a can be inserted in the support holes and the holes of the support member 26. A nut (not shown) can be assembled to the end of the bolt 36a to secure the support member 26 of the upper arm 24 to the bracket 35. Advantageously, the upper arm 24 can pivot up and down relative to the bracket 35.

The support member 28 can be formed as a hollow member or can have holes or apertures that extend only partially through the length of the support member. For instance, in some embodiments, the support member 28 can be generally solid with an aperture formed at each end. In another embodiment, the support member 28 is generally hollow such that the inner lumen of the support member 28 defines mounting holes. With the holes of the support member 28 aligned with the support holes of the bracket 35, a bolt 36b can be inserted in the support holes and holes of the support member 28. A nut (not shown) can be assembled to the end of the bolt 36b to secure the support member 28 of the lower arm 25 to the bracket 35. The lower arm 25 in the illustrated configuration is positioned generally below the upper arm 24. In addition, the lower arm 25 can pivot up and down relative to the bracket 35.

The connecting members 27a, 27b of the upper arm 24 and the connecting members 29a, 29b of the lower arm 25 preferably also are connected to the connecting rod 22. More particularly, in the illustrated embodiment, the connecting members 27a, 27b, 29a, 29b are mounted such that the connecting rod 22 can rotate relative to the connecting members 27a, 27b, 29a, 29b while the vertical movement of the connecting rod 22 is linked to the connecting members 27a, 27b, 29a, 29b.

With reference to FIG. 3, a connection member 37 is mounted to an upper portion of the illustrated connecting rod 22. The illustrated connection member 37 couples the connecting rod 22 to the upper arm 24 and the lower arm 25. The connection member 37 preferably is formed of a fixing section 37a joined to the connecting rod 22 and mounting sections 37b, 37c that are disposed laterally inward relative to the fixing section 37a. In one configuration, the mounting sections 37b are generally cylindrical. The mounting sections 37b preferably are vertically spaced.

Preferably, the holes of the connecting members 27a, 27b can be aligned with the mounting section 37b and a bolt 38a can be inserted in the holes of the connecting members 27a, 27b and the mounting section 35b. A nut 44a can be mounted to the end of the bolt 38a. Similarly, the holes of the connecting members 29a, 29b can be aligned with the mounting section 37c and a bolt 38b can be inserted in the holes of the connecting members 29a, 29b and the mounting section 37c. A nut 44b can be mounted to the end of the bolt 38b. In this manner, the illustrated connecting rod 22 can be rotatably supported on the upper arm 24 and the lower arm 25.

In the illustrated configuration, a hole is formed at the lower end of the shock absorber 21. A bolt 38c can be inserted in the hole and the insert hole 32a. A nut (not shown) can be mounted to the end of the bolt 38c. Thus, the shock absorber 21 can be connected to the steering ski 23 through the lower arm 25 and the connecting rod 22. In the illustrated configuration, a hole also is formed at the upper end of the shock absorber 21, and a bracket 35a provided on the body 10 also can be formed with a hole. The shock absorber 21 can be connected to the body 10 with the hole at the upper end being generally aligned with the hole of the bracket 35a and a bolt 36c being inserted in both the holes. A nut 44c can be mounted to the end of the bolt 36c. Other suitable mounting configurations also can be used.

The front suspension 20 also can be provided with an arm section 39 or the like. The arm section 39 rotates the connecting rod 22 about its axis. The arm section 39 can be moved in accordance with movements of the handle bar 12. The movement of the arm section, in one configuration, is generally forward and rearward, which drives the strut for rotation about its axis. Other suitable configurations also can be used to cause the steering ski 23 to be rotated to the left and right.

The illustrated steering ski 23 can be connected to the connecting rod 22 through the support shaft 22a, which is connected to the lower end of the connecting rod 22 and which allows the steering ski 23 to pivot about relative to the connecting rod 22. The steering ski 23 preferably comprises a body 41 that contacts the snow surface. The steering ski also preferably comprises a hand grip section 42 that facilitates movement of the steering ski 23 by hand. The body 41 can comprise a plate-like snow surface contact portion 41a, side portions 41b that extending upward from both of the side edges of the snow surface contact portion 41a, and a keel 41c that is formed along a portion of the snow contact portion 41a.

In operation, a switch (not shown) provided near the handle bar 12 is turned on to start the engine, and a throttle lever (not shown), which may be provided on the handle bar 12, is used to propel the snowmobile SM forward while the handle bar 12 is used to steer the snowmobile SM in a desired direction of movement. Because the steering ski 23 typically doesn't sink into snow if the snow surface on which the vehicle runs is sufficiently hard, the snowmobile SM runs stably both in a straight ahead running and during turning or cornering.

If there are objects, such as rocks or a thick growth of weeds, that protrude above the snow surface, the illustrated construction reduces the likelihood of the objects contacting the suspension assembly because the front suspension arm 20a comprises the bent portion and an enlarged space can be provided between the lower arm 25 and the snow surface. Moreover, if the snow surface on which the vehicle operates is formed by soft snow layers, the steering ski 23 can become at least partially submerged in the snow. In such situations, because a majority of the lower arm 25 is located at an elevated position due to the bent shape of the front suspension arm 20a, the front suspension arm 20a is less likely to be pulled through the snow. Accordingly, the illustrated construction results in a lower likelihood that the snowmobile SM will experience resistance due to the lower arm 25 being pulled through the snow.

Figure 12:
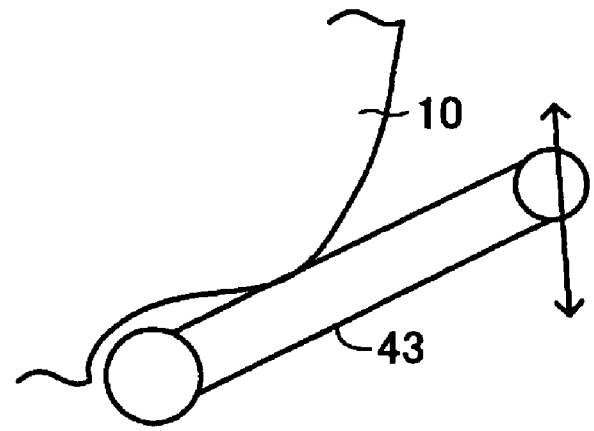
FIGS. 12(*a*) and 12(*b*) are illustrations of front suspension arms during movement, in which FIG. 12(*a*) is a view showing a conventional front suspension arm and FIG. 12(*b*) is a view showing a front suspension arm that is arranged and configured in accordance with certain features, aspects and advantages of the present invention.
Figure 12:
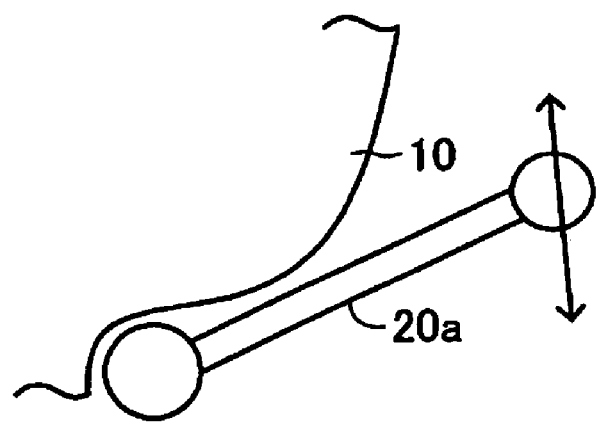

Because the cross-section of each of the arms 24a, 24b and the arms 25a, 25b comprises the oblong or oval shape having a longitudinal length longer than a vertical length, the clearance between the lower arm 25 and the snow surface is increased over a more circular construction. In addition, as shown in FIG. 12(a), if a front suspension arm 43 is used which is formed by an arm having a circular cross-section, the vertical width increases relative to an oval having the same longitudinal width. Thus, the distance between the front suspension arm 43 and the body 10 is reduced with a circular cross-section and, as a result, the front suspension arm 43 is more likely to collide with the body 10 when pivoting up and down.

With reference to FIG. 12(b), because the front suspension arm 20a is vertically smaller, the distance between the front suspension arm 20a and the body 10 is increased by the oblong or oval configuration. Therefore, even if the front suspension arm 20a pivots up and down, it is significantly less likely to collide with the body 10. Furthermore, the rigidity of the front suspension arm 20a in the longitudinal direction increases with an oblong or oval configuration, which increases the durability of the suspension arm 20a against impact forces received from the front. As a result, even if the front suspension arm 20a collides with objects that protrude from the snow surface, the front suspension arm 20a is less likely to be damaged.

Figure 13:
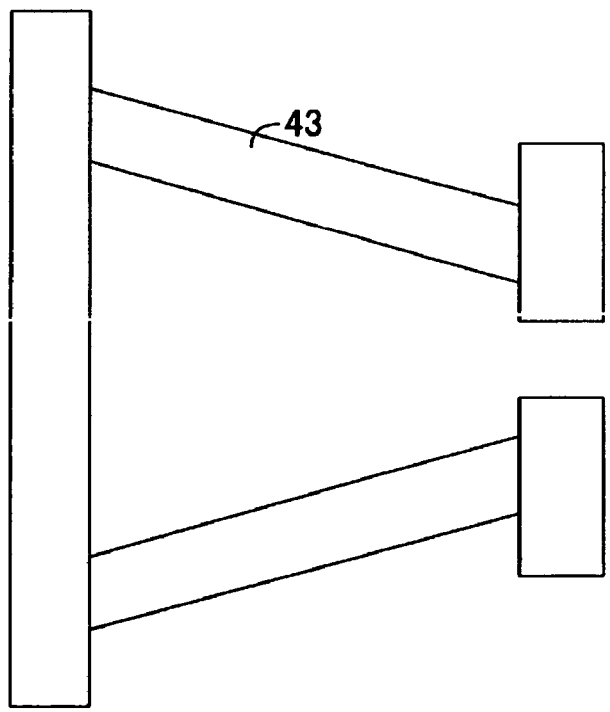
FIGS. 13(*a*) and 13(*b*) are plan views of front suspension arms, in which FIG. 13(*a*) is a plan view of a conventional front suspension arm, and FIG. 13(*b*) is a plan view of a front suspension arm that is arranged and configured in accordance with certain features, aspects and advantages of the present invention.
Figure 13:
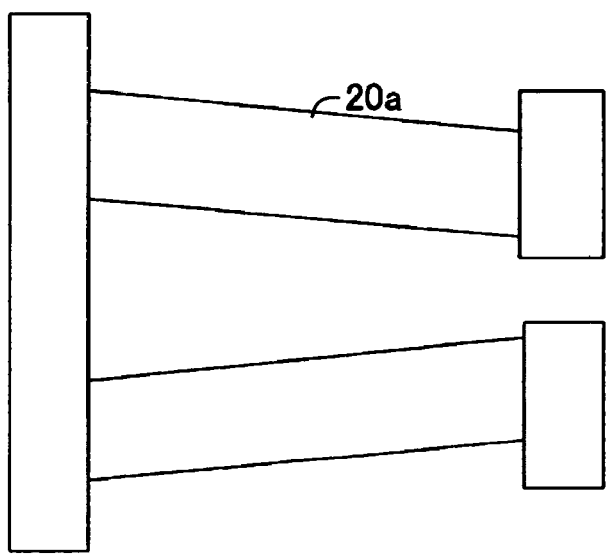

With reference now to FIG. 13(a), if a front suspension arm 43 having a circular arm is used, it is necessary to increase the longitudinal incline (i.e., increase the spacing at one end between the arms and/or decrease the spacing at the other end between the arms to adjust the amount of convergence) in order to improve the durability of the front suspension arm. In other words, the inclination is changed to improve the ability of the front suspension arm 43 to absorb impact forces received from the front. Increasing the inclination, however, increases the length of each arm. However, as shown in FIG. 13(b), because the front suspension arm 20a has a higher durability against impact forces received from the front, the inclination angle of each arm can be decreased, as well as its length.

In other configurations, the front suspension arm 20a can be formed in a straight line proximate the body 10 and can be formed with a bend proximate the connecting rod 22. The bend may be formed throughout the front suspension arm, or may be formed in any other region. Alternatively, it is possible that the bend is formed only on the lower arm and that no bend is provided on the upper arm.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A vehicle comprising a body, a first suspension arm and a second suspension arm extending laterally outward from the body, the first suspension arm being positioned generally below the second suspension arm, the first suspension arm having a first end and a second end, the first suspension arm comprising a generally linear portion proximate the first end and a bent region proximate the second end, the first suspension arm also comprising an oval cross-section in which a vertical dimension is less than a dimension perpendicular to the vertical dimension, the second suspension arm having a first end and a second end, the first end of the first suspension arm and the first end of the second suspension arm being connected to the body, a steering member attached to the second end of the first suspension arm and the second end of the second suspension arm, the steering member being positioned lower than the body, the first suspension arm comprising a bent portion such that the first suspension arm has a bent shape of a fixed angle such that the first end is located vertically higher than the second end and the second suspension arm also comprising a bent portion such that the first suspension arm has a bent shape of a fixed angle such that the first end is located vertically higher than the second end, the bent portions of both the first and second suspension arms being located substantially at a first distance from a longitudinally extending center plane of the vehicle and the first and second suspension arms extending generally parallel to each other.

2. The vehicle of claim 1, wherein the vehicle is a snowmobile and the steering member is a steering ski.

3. The vehicle of claim 1, wherein an upper surface of the front suspension is generally convex and a lower surface of the front suspension is generally concave when viewed along a longitudinal direction of the vehicle.

4. A vehicle comprising a body, a first suspension arm and a second suspension arm extending laterally outward from the body, the first suspension arm being positioned generally below the second suspension arm, the first suspension arm having a first end and a second end, the first suspension arm comprising a generally linear portion proximate the first end and a bent region proximate the second end, the first suspension arm also comprising an oval cross-section in which a vertical dimension is less than a dimension perpendicular to the vertical dimension, the second suspension arm also comprising an oval cross-section, the second suspension arm having a first end and a second end, the first end of the first suspension arm and the first end of the second suspension arm being connected to the body, a steering member attached to the second end of the first suspension arm and the second end of the second suspension arm, the steering member being positioned lower than the body, the first suspension arm comprising a bent portion such that the first suspension arm has a bent shape of a fixed angle such that the first end is located vertically higher than the second end and the second suspension arm also comprising a bent portion such that the first suspension arm has a bent shape of a fixed angle such that the first end is located vertically higher than the second end, the bent portions of both the first and second suspension arms being located substantially at a first distance from a longitudinally extending center plane of the vehicle and the first and second suspension arms extending generally parallel to each other.

5. The vehicle of claim 4, wherein the vehicle is a snowmobile and the steering member is a steering ski.

6. The vehicle of claim 4, wherein an upper surface of the front suspension is generally convex and a lower surface of the front suspension is generally concave when viewed along a longitudinal direction of the vehicle.

7. A vehicle comprising a body, a first suspension arm and a second suspension arm extending laterally outward from the body, the first suspension arm being positioned generally below the second suspension arm, the first suspension arm having a first end and a second end, the second suspension arm having a first end and a second end, the first end of the first suspension arm and the first end of the second suspension arm being connected to the body, a steering member attached to the second end of the first suspension arm and the second end of the second suspension arm, the steering member being positioned lower than the body, the first suspension arm comprising a bent portion such that the first suspension arm has a bent shape of a fixed angle such that the first end is located vertically higher than the second end and the second suspension arm also comprising a bent portion such that the first suspension arm has a bent shape of a fixed angle such that the first end is located vertically higher than the second end, the bent portions of both the first and second suspension arms being located substantially at a first distance from a longitudinally extending center plane of the vehicle and the first and second suspension arms extending generally parallel to each other, wherein at least one of the arms has an oval cross-section in which a vertical dimension is less than a dimension perpendicular to the vertical dimension.

8. The vehicle of claim 7, wherein an upper surface of the front suspension is generally convex and a lower surface of the front suspension is generally concave when viewed along a longitudinal direction of the vehicle.

9. A vehicle comprising a body, a first suspension arm and a second suspension arm extending laterally outward from the body, the first suspension arm being positioned generally below the second suspension arm, the first suspension arm having a first end and a second end, the second suspension arm having a first end and a second end, the first end of the first suspension arm and the first end of the second suspension arm being connected to the body, a steering member attached to the second end of the first suspension arm and the second end of the second suspension arm, the steering member being positioned lower than the body, the first suspension arm comprising a bent portion such that the first suspension arm has a bent shape of a fixed angle such that the first end is located vertically higher than the second end and the second suspension arm also comprising a bent portion such that the first suspension arm has a bent shape of a fixed angle such that the first end is located vertically higher than the second end, the bent portions of both the first and second suspension arms being located substantially at a first distance from a longitudinally extending center plane of the vehicle and the first and second suspension arms extending generally parallel to each other, wherein each of the arms has an oval cross-section in which a vertical dimension is less than a dimension perpendicular to the vertical dimension.

10. The vehicle of claim 9, wherein the vehicle is a snowmobile and the steering member is a steering ski.

11. The vehicle of claim 9, wherein the vehicle is a snowmobile and the steering member is a steering ski.

12. The vehicle of claim 9, wherein an upper surface of the front suspension is generally convex and a lower surface of the front suspension is generally concave when viewed along a Longitudinal direction of the vehicle.

13. A front suspension arm for a motor vehicle, the front suspension arm comprising a support member, an aperture extending at least part way through the support member, a first arm having a first end and a second end, the first end of the first arm secured to the support member, a second arm having a first end and a second end, each of the first and second arms having an oval cross-section in which a vertical dimension is smaller than a dimension generally perpendicular to the vertical dimension, the first end of the second arm secured to the support member at a location spaced from the first end of the first arm by a first distance, a first connecting member secured to the second end of the first arm, a second connecting member secured to the second end of the second arm, the first arm having a generally linear portion proximate the first end of the first arm, the first arm having a bent portion of a fixed angle proximate the second end of the first arm, the second arm having a generally linear portion proximate the first end of the second arm, the second arm having a bent portion of a fixed angle proximate the second end of the second arm, the bent portions of both the first and second arms being located substantially at a first distance from a longitudinally extending center plane of the vehicle and and the first arm and the second arm extending generally parallel to each other.

14. The front suspension arm of claim 13, wherein the cross-section extends along substantially a full length of each of the first and second arms.

15. The front suspension arm of claim 13 further comprising a joint member extending between the first arm and the second arm at a location between the support member and the first and second connecting members.

16. The front suspension arm of claim 15, wherein the joint member is positioned approximately midway along the first and second arms.

17. The front suspension arm of claim 15, wherein the joint member is positioned along the generally linear portions of the first and second arms.

* * * * *